United States Patent [19]

Foote

[11] 4,106,062
[45] Aug. 8, 1978

[54] APPARATUS FOR PRODUCING MAGNETICALLY ENCODED ARTICLES

[75] Inventor: Francis C. Foote, Huntsburg, Ohio

[73] Assignee: Addressograph Multigraph Corp., Cleveland, Ohio

[21] Appl. No.: 685,923

[22] Filed: May 12, 1976

[51] Int. Cl.² .................. G11B 5/86; G11B 25/04; G11B 15/20

[52] U.S. Cl. .................. 360/15; 235/449; 360/2; 360/84; 360/101

[58] Field of Search .............. 360/15, 16, 17, 1, 2, 360/53, 101, 131, 71; 235/61.11 D, 61.12 M, 61.9 R

[56] References Cited

U.S. PATENT DOCUMENTS

| | | | |
|---|---|---|---|
| 2,247,905 | 7/1941 | Bryce | 360/2 |
| 2,999,907 | 9/1961 | Hoshino et al. | 360/17 |
| 3,040,323 | 6/1962 | Brenner et al. | 360/2 |
| 3,409,129 | 11/1968 | Sperry | 235/61.11 D |
| 3,465,312 | 9/1969 | Rabinow et al. | 235/61.11 D |
| 3,587,856 | 6/1971 | Lemelson | 360/1 |
| 3,627,626 | 12/1971 | Chao | 360/131 |
| 3,666,894 | 5/1972 | Prochnow | 360/84 |
| 3,703,628 | 11/1972 | Philipson | 235/61.9 R |
| 3,753,255 | 8/1973 | Di Veto | 360/101 |

Primary Examiner—Alfred H. Eddleman
Attorney, Agent, or Firm—Michael A. Kondzella

[57] ABSTRACT

An apparatus is provided for producing magnetically encoded articles such as credit cards. Data from a master or other source is recorded on an elongated web carrying magnetically encodable material which is secured to a card blank or other article. Data from the master tape is stored in a memory and held for comparison with recorded data to verify correct recording. In the absence of a proper comparison the data is inserted from memory and recorded on the next card blank, which is then placed in the proper sequential position in the output stack.

13 Claims, 5 Drawing Figures

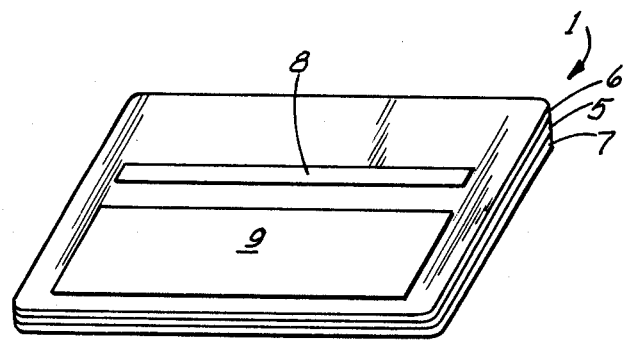
FIG. 2
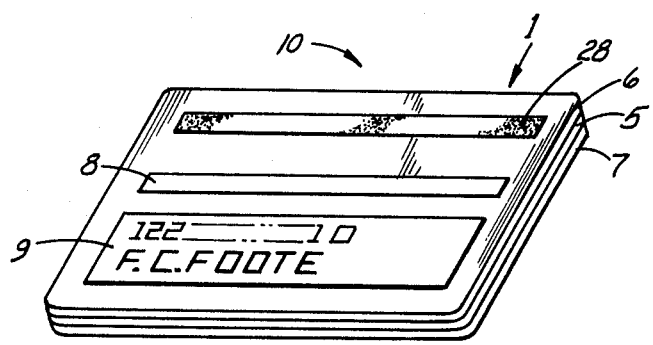
FIG. 4
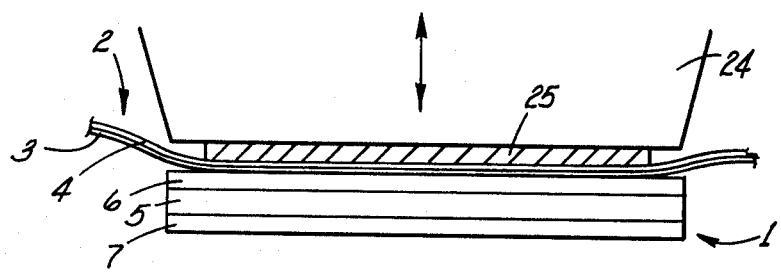
FIG 3
| STATION | STEP N<br>CARD | STEP N+1<br>CARD | STEP N+2<br>CARD |
|---|---|---|---|
| ACCESS | f | b | g |
| RECORD | e | f | b |
| STAMP | d | e | f |
| STRIP | c | d | e |
| VERIFY | b(ERROR) | c | d |
| PRINT | a | — | c |
FIG. 5

APPARATUS FOR PRODUCING MAGNETICALLY ENCODED ARTICLES

BACKGROUND OF THE INVENTION

This invention relates to an apparatus or system for producing magnetically encoded articles.

In the context of the present invention, a magnetically encoded article is one in which a magnetic stripe is carried by an article for storing information. Credit cards, electronically encoded identification cards and magnetic programming cards for calculators are exemplary of the forms of magnetically encoded articles which may be produced by the present invention.

It is current practice to manufacture cards with magnetic stripes and stockpile such at issuing centers for subsequent embossing and encoding at the time of issuance. With the advent of credit authorization systems and printing terminals, magnetic stripe cards are becoming more important in the business world. It is anticipated that such cards, for the most part, will not contain embossed data, but store all transaction related information on the magnetic stripe. However, as explained herein, present day production methods do not readily lend themselves to the mass production of such cards.

With existing systems the first step in the manufacture of credit cards involves non-encoded card blanks which are produced and stockpiled for encoding at various locations. Generally, encoding of the magnetic stripe data is carried out by the card issuer, or organization responsible for operation of the card plan. In addition, human-readable indicia is often formed on the card. Commonly this is done by embossing at the time of encoding which also allows data capture by imprinting at the point of sale. The encoded cards must then be prepared for mailing to the user. A mailing envelope is printed and the finished credit card inserted therein with a printed folder. It is not uncommon for systems to automatically print the envelopes and folders.

Credit card production methods commonly practiced are order-dependent. In other words, the human-readable indicia placed on the card corresponds to particular magnetically encoded information, such as account number. Therefore, it is necessary to keep the cards in the same sequence in which they were encoded. Further, maintaining the correspondence of cards to printed jackets and envelopes to which they correspond is also order-dependent.

Certain disadvantages arise from the commonly practiced procedures. In the encoding process, the card blanks are moved past a recording head by a transport apparatus for encoding. For satisfactory encoding, it is necessary to control interbit jitter within certain standards. Generally speaking, interbit jitter is non-uniformity in spacing of digital bits encoded in the magnetic material. This is due primarily to variations in speed or timing during the encoding process. Even when a shaft encoder is utilized with the transport, slippage between the card blank and the drive rollers will result in interbit jitter. Due to the mass and inertia of a card blank, glazing of the drive roll, misadjustment of drive roll force, etc., the slippage may be significant resulting in an unacceptable level of interbit jitter. On the other hand, it is less difficult to maintain tolerances for interbit jitter when encoding the information directly onto magnetic tape not affixed to a card. Thus, it would be desirable to have a system for producing credit cards wherein the magnetic information is recorded prior to bonding of the tape to the blank.

Another disadvantage is that if a card is improperly encoded, it must be rerun with the next batch or sequence of cards. This requires that the data for that particular card be recorded on the master tape for the subsequent run or otherwise inputted into the system. Such results in modification of the original card order and causes significant delays and additional handling steps in the process. This is true even for systems which do not emboss data on the cards. Therefore, it would be desirable to have a system capable of re-encoding cards automatically and maintaining the original card sequence.

SUMMARY OF THE INVENTION

The apparatus of the present invention overcomes the above-described disadvantages of existing systems by recording the magnetic data onto a web of tape prior to transfer of the card blanks. This minimizes interbit jitter, thereby reducing the likelihood of defective cards produced in a run. Also, since the card blanks transported to the issuer do not contain magnetic stripes, overall security is significantly enhanced. The system of the present invention also checks the magnetic data of each card for quality and content. If the data is unacceptable, the system effects a re-encoding operation and inserts the new card into the original card sequence.

It is an object of the present invention to provide a unique apparatus for producing a magnetically encoded article in which data is recorded directly onto magnetically encodable web material and the recorded material subsequently secured to the article.

Another object of the present invention is to provide a process of the type described in which the recording and securing steps are synchronized to provide a process by which a sequence of magnetically encoded articles are produced with a high degree of efficiency.

It is a further object of the present invention to provide a versatile system for producing a sequence of encoded cards or the like, with means for checking the magnetic data of each card and, in the event of a defect, encoding a new card blank and inserting it into the sequence without the need for modifying a master tape or inserting the card into the next sequence.

BRIEF DESCRIPTION OF THE DRAWINGS

The means by which the foregoing objects and features of invention are achieved are pointed out with particularity in the claims forming the concluding portion of the specification. The invention, both as to its organization and manner of operation, may be further understood by reference to the following description taken in connection with the following drawings, wherein:

FIG. 2 is a perspective view of a typical card blank prior to presentation to the system;

FIG. 3 is a simplified sectional view of the card blank at the transfer station associated with the present invention;

FIG. 4 is a perspective view of a completed card manufactured by the system of the present invention; and FIG. 5 is a timing chart illustrating the sequence of operation of the system of FIG. 1.

DESCRIPTION OF THE PREFERRED EMBODIMENT

Figure 1:
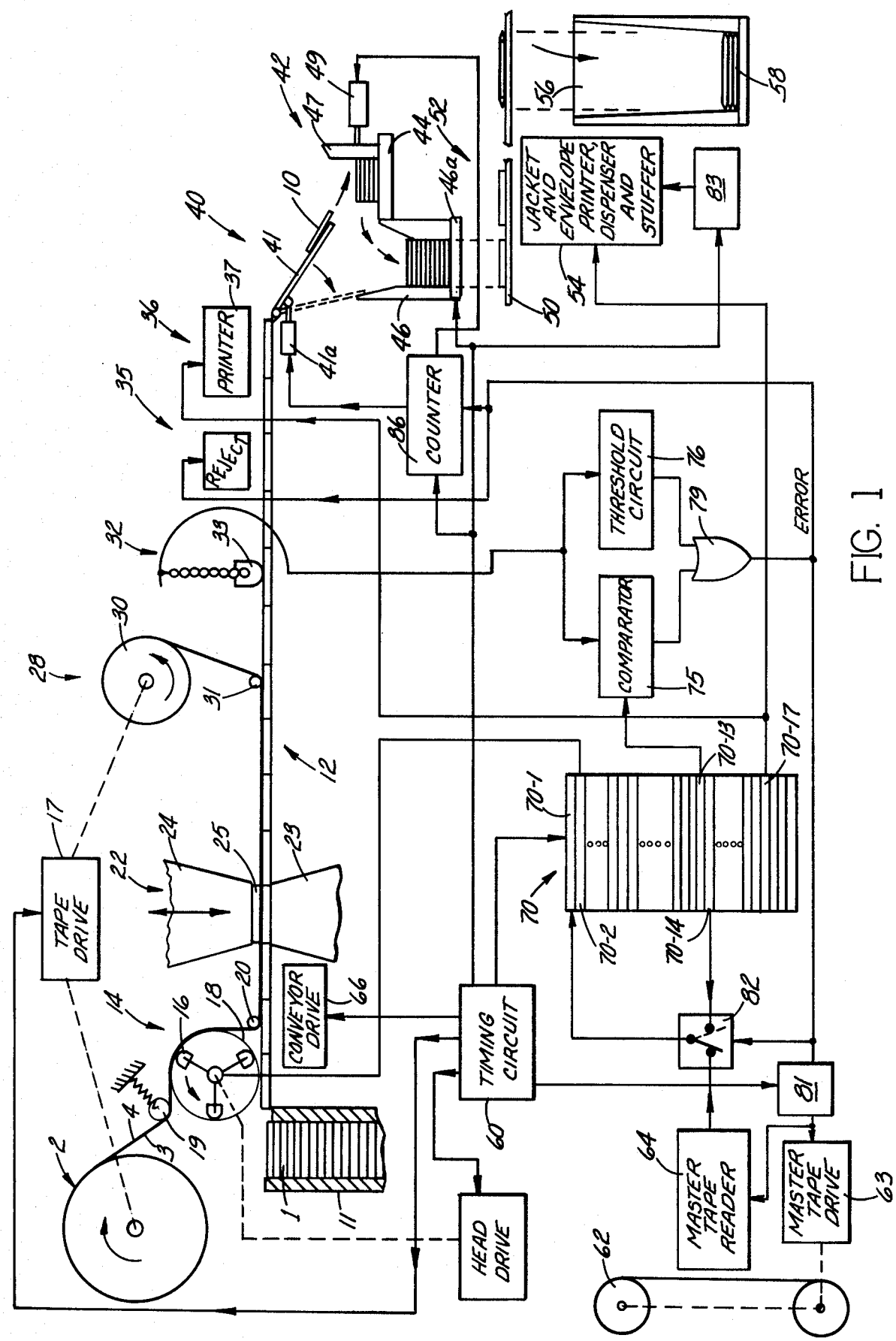
FIG. 1 is a diagrammatic illustration of a system operating in accordance with the present invention for producing an exemplary form of magnetically encoded articles, namely credit cards.

FIG. 1 is a diagrammatic illustration of a system for producing a magnetically encoded composite article. While the preferred embodiment is discussed in terms of credit card production, the invention is not limited thereto. The system illustrated in FIG. 1 may be provided, for example, at a banking center or other such central location where credit cards are produced for provision to customers of a large number of branch banks.

Referring to FIG. 1 credit card blanks 1 are provided for bearing magnetically encodable material to provide completed credit cards 10 (FIG. 4). Magnetically encodable web material is provided in the form of a roll of magnetic tape 2 including a layer of magnetic material 3 and polymeric carrier layer 4. In accordance with the present invention, data for each card is recorded upon a segment of the tape 2 and the magnetic material thereof is transferred to the credit card blank 1. The credit card blank 1 may take any one of a number of forms such as that illustrated in FIG. 2. A PVC or polyvinyl chloride acetate (PVCA) core stock 5 has upper and lower surface laminates 6 and 7 of clear PVCA. A conventional signature panel 8 is adhered to the upper surface laminate 6. Additionally an address panel 9 may be provided for printing human-readable indicia thereon. The magnetically encodable web material may be of a type of commonly utilized magnetic recording medium so long as it is compatible with the hot stamping process described herein. In the preferred embodiment, the well-known form of "hot-stamping" is utilized to secure the magnetic oxide layer 3 to the credit card blanks 1, and a suitable form of magnetic tape described further below is utilized.

The card blanks 1 are provided from a source such as a stack feeder 11 to a card moving conveyor 12. The conveyor 12 includes drive means for moving one increment of distance at a time and dwelling for a preselected time interval. The increment of distance corresponds to the width of one card blank 1 plus any desired clearance. Operations are performed at work stations along the conveyor 12. In order to provide for a continuous flow of cards, the conveyor 12 may be viewed as having a number of sections each a predetermined number of cards wide. One card is operated upon at each section. A work station 14 is provided with a recording means 16 for magnetically writing predetermined information onto a length or segment of tape. A drive means 17 controls pay out and take up of the tape such that is moves past recording means 16 with the magnetic layer 3 in engagement therewith. Preferably, the drive means 17 pulls the tape from the roll 2 to a take up roll 30 incrementally one segment at a time. The recording means 16 comprises a rotating drum 18 carrying at least one recording head and operating in a manner similar to that of video tape recording heads. As shown in the drawing, three recording heads are utilized which may be individually operated in sequence. An idler arm 19 and a biasing roll 20 are spatially disposed with respect to the recording drum 18 to assure that a sufficient length of magnetic tape is in engagement therewith after each step advance. The idler arm 19 is arranged to mechanically bias the magnetic tape to place a substantially constant mechanical drag on the drum 18 to reduce interbit jitter and improve recording reliability. As a further refinement, the information can be clocked out by a high resolution shaft encoder on the axis of 16.

The conveyor 12 next carries cards one increment of movement at a time through a transfer station 22 which includes a well-known hot stamping press. Operation of the work station and hot stamping process are illustrated in greater detail in FIG. 3 to which reference is made. A platen 23 and a stamping element 24 having a stamping die 25 maintained in registration with the length of tape disposed over the card, are provided. During a dwell time between incremental movements of the cards 1 and the tape, drive means (not shown) bring the die 25 in engagement with the tape to form a magnetic panel on the card 1.

The magnetic tape has a polymeric carrier layer 4 of a material such as polyethylene terephalate, and a magnetically encodable layer 3 preferably of gamma ferric oxide particles in a suitable binder. The oxide layer of the tape is brought into engagement with the PVC surface laminate 6 and the polymeric carrier layer 4 is stamped. Binders in the oxide layer 3 adhere to the PVC, the the polymeric carrier layer 4 is stripped away to form a magnetic stripe 28 on the credit card. It has been found in accordance with the present invention that encoded data in the magnetic layer is retained during hot stamping process. The magnetic stripe formed on the card 1 is generally not the full width thereof, and portions of oxide on the carrier layer 4 which are not adhered to the card blank 1 remain on the carrier layer 4. Downstream of the unit 22, a carrier layer take-up roll 30 is provided which rotates and pulls up the polyethylene terephalate carrier layer 4 from the cards 1 at a stripper roller 31.

It is significant to note that in the preferred embodiment, the magnetic material recorded upon is on the lower side of the tape and bonded to the card. Thus the tape is recorded on its lower side and after production read out on its upper side. Very simple empirical adjustments to the write current supplied to the recording means 16 may be performed to assure adequate level of readout voltage in response to reading out from the upper side of the magnetic stripe 28. In addition, or alternately, adjustments may be made to the solid content of the oxide layer.

A next work station 32 comprises a magnetic reading head 33 which reads the information encoded on the credit card for verification of successful and correct encoding. Successful encoding is that which provides an output at the read head 33 in accordance with predetermined standards of signal amplitude (e.g., the limits of ANSI X4.16-1973, Sect. 4.1); correctness in recording is measured with respect to the data supplied to the recording means 16. This station may also check for gross errors in stripe placement. A reject station 35 is provided for removing unsuccessfully or incorrectly encoded cards from the conveyor 12 in response to the sensing of an incorrect recording as by the data and control means described below.

Depending upon the nature of the application, a station 36 may be provided including a printer 37 for encoding the card with human-readable indicia. Data flow is synchronized as described below so that input data for the printer 37 corresponds to the magnetically encoded data on the particular card blank 1 in registration therewith. In the preferred embodiment, the printer 37 is an impact printer which prints on the expanded address panel 9. Other such printers for transferring visual indicia could also be used to provide a finished credit card 10 as illustrated in FIG. 4.

At a next station 40, cards are channeled by controlled deflector means 41 to a stacking means 42, including a pair of stackers 44 and 46. To provide a continuous process in which order of credit cards 10 is maintained, it is desirable that if a card is rejected, the card 10 produced by recycled information be provided in the same order in the station 40 with respect to other cards as if it were correctly produced.

The deflector means 41 is operated under control of a solenoid 41a, or other appropriate means, to direct correctly produced cards into stacker 46 under normal conditions. Upon occurrence of a card error, deflector means 41 is operated to direct subsequently correctly produced cards to stacker 44 (as shown in solid line in FIG. 1) until the card replacing the rejected card is produced. After a proper number of incremental counts and verification of a correctly produced replacement card read by the read head 33, the deflector means 41 places the corrected card into stacker 46, and subsequent cards into stacker 44.

The stacker 44 is provided with a card shifter 47 operated by a solenoid 49, or the like, under control of a counter circuit 86. After a replacement card has been placed on top of the stack at 46, shifter 47 is operated to shift all cards collected at stacker 44 into stacker 46. The stacking means 42 also operates as a card dispenser to deliver cards in their original order to an appropriate output station 52 which may include a further conveyor 50. This is achieved by a card dispensing door 46a. The station 52 is shown as including an envelope printer and stuffer 54, which preferably operates in synchronism with the printer 37, for placing completed cards in printed envelopes bearing information corresponding to the card to be inserted therein. The printer and stuffer unit 54 may also include a jacket printer; a jacket being a folded, slotted piece of paper for receiving a credit card 10 possibly bearing printed indicia corresponding to the card to be included therein. The output of the station 52 may simply be provided to a receiving means such as a bin 56 in which stuffed envelopes 58 are stacked, ready for mailing. Well-known means may be provided to seal the printed envelopes and imprint postage thereon for mailing to credit card users.

The data and control circuitry of FIG. 1 synchronizes the above-described operations and provides for proper data flow within the system. A master timing circuit 60 provides appropriate clock signals for synchronizing the various operations. Data is provided from a machine readable file such as master tape 62 driven by a master tape drive 63 and read by a master tape reader 64. The timing unit 60 steps the master tape 62 a segment at a time, each segment containing information for one credit card 10. The information on the master tape 62 is prepared by the issuing agency and contains a number of sequentially recorded data sets, each corresponding to a particular credit card in the series to be produced. Each data set is defined by a serial train of data bits indicative of information which will be used by card reading means. Such information normally includes a start code, a format code which tells the card reading apparatus which one of a number of standardized formats the data is arranged in, account number, user name and other discretionary data, a stop code and checking bits.

The output of the master tape reader 64 is clocked into a first location 70-1 of a memory means 70. In the context of the present invention, the term location is used to indicate a memory space suitable for holding a complete data set corresponding to one card. The actual physical location of this data may remain the same, depending upon the nature of memory utilized. For example, it is common with random access memories to shift "pointers" between memory locations or addresses under control of an appropriate program. However, for the purposes of this description the data sets will be considered as shifting within the memory. A plurality of locations 70-1 through 70-$n$ are provided, where $n$ is a natural number large enough to provide for desired operations as described below. The entire data set in each location is shifted to a next location as a new data set is written into location 70-1. Preferably, there is a one-to-one correspondence between the number of locations of memory means 70 and the number of card locations along conveyor 12.

Memory location 70-2 provides an output to the recording means 16, while data at the other locations is outputted to carry out various other operations. For example, if the conveyor 12 is arranged such that recorded data provided to the recording means 16 is recorded at a time interval 2 and the card blank 1 bearing that same data reaches the verification read head 33 at some predetermined time interval thereafter. This depends upon the number of card locations in the system, etc. For consistency with FIG. 1, and the purposes of this description, verification of card blank 1 will be considered to occur at the 13th time interval. At this time an output is provided from the register stage 70-13. This output and the output of the verification read head 33 are provided to a comparator means 75 which compares the information recorded on a credit card 10 with the data used to encode the card originally.

The output of the read head 33 is also connected to a threshold circuit 76 which checks various characteristics of the signal, such as signal amplitude to determine if predetermined recording standards have been met. Upon indication of either an incorrect or unsuccessful recording, comparator 75 or threshold circuit 76 provide an error signal to an OR gate 79 which effects operation of an inhibit circuit 81 and a convention type switching circuit 82. In response to an error, circuit 81 inhibits the next advance of the master tape drive 63. The switching circuit 82 connects the output of the next memory location 70-14 to input the data set of the improperly recorded card to location during time interval 14. This time interval corresponds to position of the data from which the erroneous card was produced. Thus, in response to an error in a recorded card, the correct information from the location 70-14 is rewritten into location 70-1.

The error output of the OR gate 79 is also connected to a counter circuit 86 for controlling the stacking and dispensing of credit cards as described above. Counter 86 is of the "count down" type and is reset by the error signal. Signals from the master timing circuit 60 control the count down operation. When the counter is reset in response to an error signal the count is advanced to a predetermined number corresponding to the number of card locations between the recording means 14 and the card stacker means 40. An output from counter 86 greater than zero causes operation of deflector 41 to the solid line position shown in FIG. 1. When counter 86 reaches a count corresponding in time to the arrival of the replacement card at the stacker station, deflector 41 is moved to its original position (shown in phantom) to dispense the replacement card to stacker 46. Signals from counter 86 then effect operation of mechanism 49 to shift the cards collected by stacker 44 into stacker 46 on top of the replacement card. Deflector 41 remains in its original position, whereby the following cards in the sequence are delivered to stacker 46 until such time as an "error" is detected.

At a subsequent location, say 70-17, of the memory means information is provided to the printing unit 37 for the card in registration with the printing unit. The location 70-17 may simultaneously provide data to the envelope and jacket printing and stuffing unit 56. A counting means 83 controls dispensing of the jackets and envelopes to assure that such will be matched with the corresponding credit card.

The sequence of operations for correcting an error is reflected in the chart of FIG. 5, wherein the "step" count corresponds to the number of incremental advances. FIG. 5 illustrates a simplified form of the system in which operations are performed simultaneously on cards 'a' through 'f' at stations 14, 22, 28, 32, 35 and 37. For the purposes of this description, it will be assumed that cards 'a' through 'f' are in a continuous series in the system with one card at each station. In actual practice, however, there probably would be several cards separating the adjacent station, such as illustrated in FIG. 1. When the system is at step "N", card 'a' has passed through the system to the print station, while cards 'b' and 'c' are at the verification and stripping stations, respectively. At the same time, cards 'd', 'e' and 'f' are at the lamination, recording and access stations, respectively. In the example illustrated in FIG. 5, the magnetic data recorded on card 'b' at the verification station is in error. At this stage, advancement of the master tape is inhibited and the data for the improperly recorded card is shifted within the memory to the input location (70-1 in FIG. 1). This is shown in FIG. 5 in the column labelled "Step N+1" wherein the data for card 'b' is accessed from the memory rather than the master tape. Cards 'c', 'd', 'e' and 'f' are each advanced to the next work station. Since card 'b' has been rejected from the system, no card is present at the print station during step N+1. At step N+2 each of the card blanks is advanced to the next station and a new card blank 'g' is introduced into the system with the corresponding data set being read from the master tape and written into memory. Also deflector 41 associated with the stacker means is operated whereby card 'c' will be deflected into stacker 47 after it leaves the print station. The deflector is held in this position for three additional steps by the system, whereby cards 'd', 'e' and 'f' are likewise deflected to stacker 47. Just before card 'b' arrives at the stacker means, the deflector is returned to its original position, whereby card 'b' is directed to stacker 46 on top of card 'a'. The cards accumulated in stacker 44 are then shifted into stacker 46 to maintain the original sequence.

With the provision in the above system for rejecting an improperly encoded card and providing a correct card in its place in the proper relative location relative to other cards, the ability to maintain order of printed cards, which is important in current usage is greatly increased. Further, the overall system efficiency is enhanced. It will be appreciated that the system of the present invention will maintain the original sequence so long as the stacker means can accommodate the number of errors. If two stackers are used, as illustrated in FIG. 1, the original sequence is maintained so long as no more than one incorrect card is being processed by the work stations at one time. Of course, higher error rates may be accommodated by providing additional stackers and making appropriate changes to the controlled circuitry as would be obvious to those skilled in the art.

From the foregoing description, it will be appreciated that the system of the present invention provides a versatile means of mass producing a large number of magnetic stripe cards in sequence and in a manner which reduces the likelihood of excessive interbit jitter. Furthermore, the system of the present invention includes means for detecting defectively encoded cards and reinserting the corresponding data sets into the sequence. It is not intended that the present invention be limited to systems requiring maintenance of the original sequence, as the present invention readily lends itself to the mass production of magnetic stripe cards where the maintenance of a predetermined sequence is not essential. For example, the stacker means with deflector could be eliminated from the system, yet the benefits of reinserting the original data back into the system are still realized. It is also emphasized that modifications to the specific circuitry and mechanical means may be made within the scope of the present invention.

What is claimed is:

1. A system for producing articles bearing magnetic data, said system comprising:
   an elongated web comprising a carrier element with magnetic material thereon,
   means for advancing said web from a supply station, along a path past a recording station and a transfer station, to a take-up station, said recording station being located between said supply station and said transfer station.
   means for recording magnetic data on selected segments of said web at said recording station,
   means for transporting each of said articles past said transfer station,
   means for transferring said magnetic material with data recorded thereon from a said segment of said web to a corresponding article at said transfer station, and
   control means including means for timing operation of said web advance means with operation of said transport means whereby each said segment is brought into general alignment with a corresponding one of said articles at said transfer station to allow transfer of said magnetic material thereto.

2. The system set forth in claim 1 wherein said web advance means advances said web incrementally a segment at a time.

3. The system set forth in claim 2 wherein said control means includes means for effecting operation of said transfer means and said recording means between incremental advances of said web by said web advance means.

4. The system set forth in claim 2 wherein said control means includes means for effecting operation of said recording means between said incremental advances of said web by said web advance advance means.

5. The system set forth in claim 2 wherein said control means includes means for effecting operation of said transfer means between said incremental advances of said web by said web advance means.

6. The system set forth in claim 1 wherein said recording means includes a recording head mounted to a rotatable member and means for rotating said recording head and rotatable member relative to one of said web segments in operative engagement therewith between incremental advances of said web.

7. The system set forth in claim 6 wherein said rotatable member includes a generally cylindrical surface which contacts said web.

8. The system set forth in claim 1 wherein said web advance means incrementally advances said web by a predetermined length at a time.

9. The system set forth in claim 8 wherein said control means includes means for effecting operation of said recording means between said incremental advances by said web advance means.

10. A system for producing a series of documents each with a magnetic data set, said system comprising:
   data source means for providing a sequence of data sets each to be recorded on a document in a series of documents, each data set being substantially unique from the others
   means for sequentially outputting said data sets from said data source means,
   memory means for sequentially storing said outputted data sets for said series of documents,
   means for recording each said outputted data set on a document in said series,
   means for effectively comparing the data set recorded on each document with the corresponding data set stored in said memory means, and
   control means including means responsive to the absence of a proper comparison within predetermined limits for causing said recording means to record on a subsequent document in the series said data set which was previously recorded defectively in lieu of the next data set in said sequence.

11. The system set forth in claim 10 wherein said control means includes means operative in response to said absence of a proper comparison for modifying said sequence of data sets by inserting into the remainder of said sequence to be recorded said data set which was previously recorded defectively.

12. The system set forth in claim 11 wherein said control means includes means responsive to said absence of a proper comparison for temporarily inhibiting the outputting from said data source means of the next data set in said sequence while modifying said sequence.

13. The system set forth in claim 12 wherein said control means includes means for checking the quality of the data recorded on each article and, said means being responsive to the absence of a certain quality standards for causing said recording means to record on a subsequent document in the series said data set which was previously recorded defectively in lieu of the next data set in said sequence.

* * * * *